United States Patent [19]

Verloop et al.

[11] 4,153,674

[45] May 8, 1979

[54] SULFUR RECOVERY FROM GASES RICH IN $H_2S$ AND $CO_2$ AS WELL AS COS OR ORGANIC SULFUR

[75] Inventors: Jan Verloop; Rudolf C. Goetzee; Erik S. E. Werner, all of The Hague, Netherlands

[73] Assignee: Shell Oil Company, Houston, Tex.

[21] Appl. No.: 858,318

[22] Filed: Dec. 7, 1977

[30] Foreign Application Priority Data

Dec. 7, 1976 [GB] United Kingdom ............... 50996/76

[51] Int. Cl.$^2$ .............................................. C01B 17/00
[52] U.S. Cl. ................... 423/573R; 423/228; 423/574 R
[58] Field of Search ......................... 423/228, 573, 574

[56] References Cited

U.S. PATENT DOCUMENTS

| | | | |
|---|---|---|---|
| 3,752,877 | 8/1973 | Beavon | 423/564 X |
| 3,965,244 | 6/1976 | Sykes | 423/228 |
| 3,989,811 | 11/1976 | Hill | 423/573 X |
| 4,001,386 | 1/1977 | Klein et al. | 423/574 |

FOREIGN PATENT DOCUMENTS 2407370  8/1974  Fed. Rep. of Germany ........... 423/228

*Primary Examiner*—G. O. Peters

[57] ABSTRACT

In a process for recovery of sulfur by the Claus process from hydrogen sulfide-containing gases, in which process residual sulfur compounds in the Claus off-gas are reduced to hydrogen sulfide which is selectively absorbed, recovered and recycled to the Claus reaction, the process is adapted for conversion of feed gas which is high in $CO_2$ and which also contains significant amounts of COS and/or organic sulfur compounds by having such fresh feed gas bypass the Claus reactor and combining it with the Claus off gas ahead of the reduction step.

13 Claims, 2 Drawing Figures

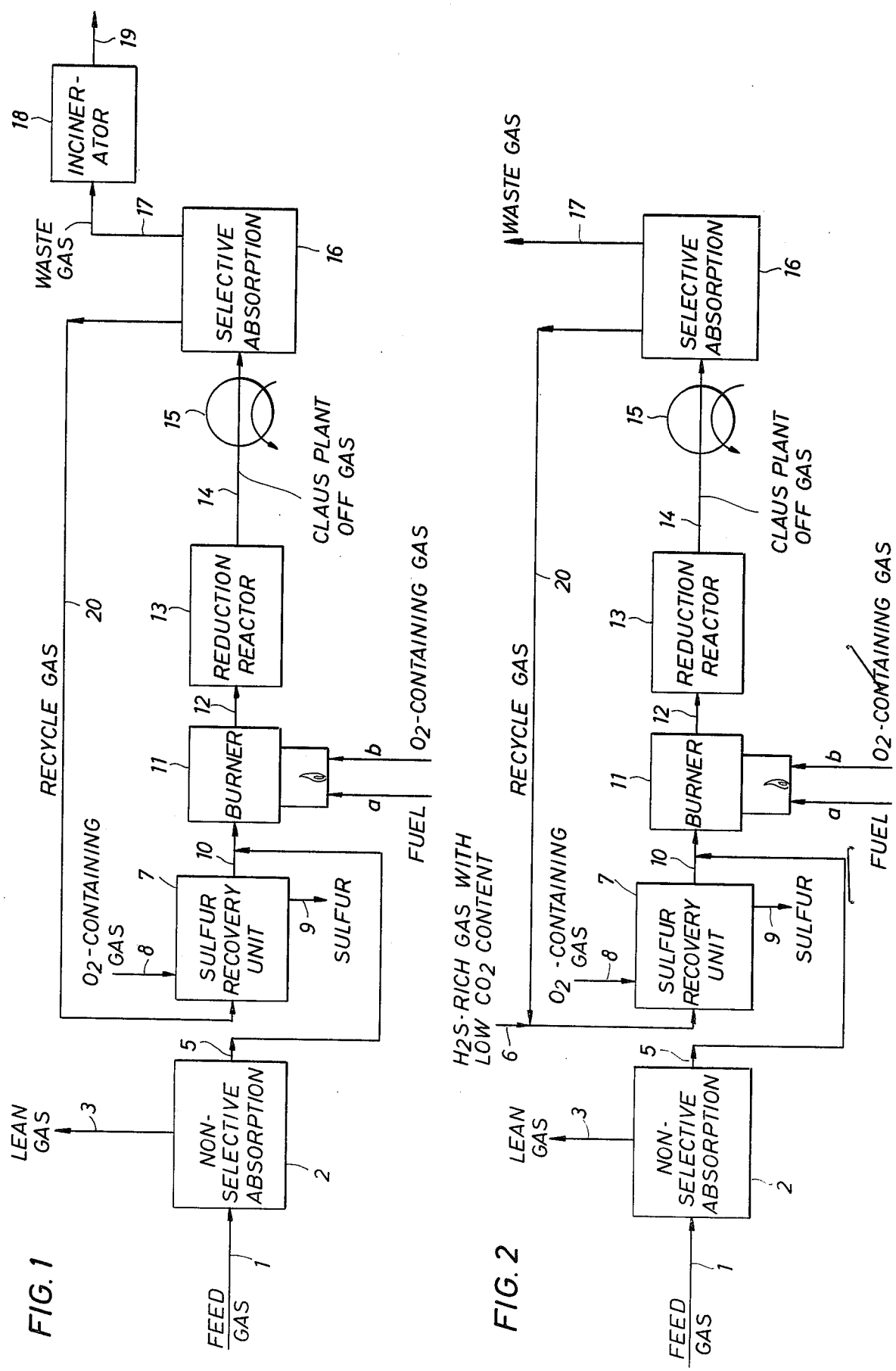

SULFUR RECOVERY FROM GASES RICH IN H₂S AND CO₂ AS WELL AS COS OR ORGANIC SULFUR

CROSS-REFERENCE TO RELATED APPLICATION

A related process for treatment of fresh feed gas rich in $CO_2$ but not significantly contaminated with COS or organic sulfur compounds is the subject of commonly owned U.S. Ser. No. 775,357 of Groenendael et al, filed Mar. 7, 1977.

BACKGROUND OF THE INVENTION

1. Field of the Invention

The invention relates to a process for working-up hydrogen sulfide-containing gases in which the sulfur constituents of the said gases are converted to elemental sulfur in a sulfur recovery unit.

2. Description of the Prior Art

In general, feedstocks for sulfur recovery units are hydrogen sulfide-containing gases produced in the regeneration step of gas purification processes. These gas purification processes, which are required in order to reduce the sulfur constituents (in most cases mainly hydrogen sulfide) of industrial gases, such as refinery gas, natural gas or synthesis gas produced by the partial combustion of hydrocarbons, to acceptably low levels prior to their further use, usually involve absorbing the sulfur components of the gases in a liquid absorbent which is then regenerated to give hydrogen sulfide-rich gases. These latter gases are then passed to a sulfur recovery unit, elemental sulfur being produced and removed. The reaction off-gases of such a unit are then preferably further treated in order to reduce the sulfur content of the gases to a very low level before the gases are finally discharged to the atmosphere.

In the sulfur recovery unit the hydrogen sulfide is converted to elemental sulfur by the well-known Claus reaction. Sulfur recovery units of the Claus type or Claus plants are widely used in industry and are well-established.

In the following description, "Claus reaction" refers to the reaction between hydrogen sulfide and sulfur dioxide in which elemental sulfur and water are produced. By "sulfur recovery unit of the Claus type" or "Claus plant" is meant a plant for carrying out the Claus reaction, incorporating a thermal zone in which hydrogen sulfide is partially combusted to produce sulfur dioxide in the correct proportion which then reacts with the unburned hydrogen sulfide to give sulfur and water, the sulfur then being condensed and recovered, followed by one or more catalytic zones in which the same reaction is further promoted by means of a suitable catalyst and additional sulfur is recovered.

The process carried out in a Claus plant is sometimes referred to in literature as modified Claus process.

Apart from hydrogen sulfide, the above-mentioned industrial gases often contain other sulfur constituents such as carbonyl sulfide and other organic sulfur compounds, e.g., mercaptans, which must also be removed before these gases are used. Accordingly, a suitable liquid absorbent is used which removes all sulfur constituents present. However, the said industrial gases usually also contain carbon dioxide. The liquid absorbents applied in the gas purification processes for the removal of hydrogen sulfide are generally also good absorbents for carbon dioxide. For the removal of carbonyl sulfide by means of absorption, a solvent is in practice used which is an efficient absorbent for carbon dioxide. Consequently, regeneration of the fat liquid absorbent yields hydrogen sulfide/carbon dioxide-containing gases which have then to be processed in the Claus plant.

A process for reducing the sulfur content of off gases from a Claus plant by conversion of the sulfur content of the gases to H₂S, absorption of the H₂S, recovery thereof and recycle to the Claus plant is the subject of U.K. Patent Specification No. 1,356,289. Said process is readily operable so long as the gases recycled to the Claus plant have a low carbon dioxide content (up to about 15% by volume) and a relatively high hydrogen sulfide content (above 50% by volume). However, if the gas fed to the Claus plant contains very high amounts of carbon dioxide, a Claus plant must be specially designed to handle such a feed. Such a plant is larger and less efficient then a plant designed for a feed with low $CO_2$ content. If, moreover, the hydrogen sulfide content of such hydrogen sulfide/carbon dioxide-containing gases is less than 40% by volume, the Claus plant is difficult to operate with respect to the thermal zone and special measures have to be taken when combusting part of the hydrogen sulfide to produce the necessary sulfur dioxide required for the Claus reaction. These operational difficulties mainly arise from the fact that the required temperatures for the combustion of hydrogen sulfide cannot be reached in the thermal zone.

Nowadays, industrial gases have to be purified with gas purification processes which yield hydrogen sulfide/carbon dioxide-containing gases which have even less than 20% by volume of hydrogen sulfide whereas the carbon dioxide content is above 20% by volume. Such industrial gases may also result from processes for the conversion of solid fuels, such as coal, to low sulfur gas or liquid fuel.

SUMMARY OF THE INVENTION

It is an object of the present invention to provide a process which will enable hydrogen sulfide-containing gases which comprise a high content of carbon dioxide and in addition thereto carbonyl sulfide or other organic sulfur compounds to be processed in a sulfur recovery unit of the Claus type. It is a further object to provide a process which will enhance the sulfur recovery efficiency of such units by further treatment of the reaction off-gases of the said units, thereby alleviating the problem of environmental pollution by sulfur compounds.

The invention accordingly relates to a process for working-up hydrogen sulfide-containing gases wherein the sulfur constituents of the said gases are converted to elemental sulfur in a sulfur recovery unit of the Claus type (a Claus plant), the sulfur thus formed then being recovered from the process, and where at least one feed stream contains a high proportion of $CO_2$ as well as carbonyl sulfide and/or other organic sulfur compounds. The process comprises the following steps:

(a) the reaction off-gas of said Claus plant is passed, jointly with a hydrogen sulfide-containing gas recovered from step (d), below, which comprises a high content of carbon dioxide and in addition thereto carbonyl sulfide and/or other organic sulfur compounds, at a temperature in the range of from 180° C. to 450° C. in the presence of free hydrogen- and/or free carbon monoxide-containing gas over a sulfided Group VI and/or Group VIII metal catalyst supported on an inorganic oxidic carrier for the reduction of sulfur compounds other than hydrogen sulfide to hydrogen sulfide;

(b) the reduced gas mixture obtained in step (a) is cooled and passed in an absorption zone, at a temperature below the dew point of water, through a liquid and regenerable absorbent for hydrogen sulfide at a gas velocity of 1 m/sec. or more with respect to the aerated part of the said absorption zone;

(c) the unabsorbed portion of the gas mixture, after passage through the said absorbent, is discharged from the process and the hydrogen sulfide-enriched absorbent is regenerated, thereby producing a hydrogen sulfide-rich gas mixture and regenerated absorbent, and (d) the regenerated absorbent obtained in step (c) is re-used in step (b) for further hydrogen sulfide absorption and the hydrogen sulfide-rich gas mixture is passed to said sulfur recovery unit for the production of elemental sulfur, optionally in combination in fresh feed gas which contains hydrogen sulfide but is low in $CO_2$.

BRIEF DESCRIPTION OF THE DRAWING

FIG. 1 is a schematic flow diagram of one mode of practicing this invention.

FIG. 2 is a schematic flow diagram of a second mode of practicing this invention.

DESCRIPTION OF THE PREFERRED EMBODIMENTS

Reaction off-gas of a sulfur recovery unit of the Claus type still contains sulfur compounds, as the yield of recovered elemental sulfur in respect of hydrogen sulfide introduced is not completely quantitative. In addition to the sulfur compounds it may also contain some mist of elemental sulfur. A typical reaction off-gas may have following composition:

| | | |
|---|---|---|
| $H_2S$ | 0.1 – 2 | % vol. |
| $SO_2$ | 0.05 – 2 | % vol. |
| COS | 0.01 – 0.2 | % vol. |
| $CS_2$ | 0.01 – 0.2 | % vol. |
| $S_{el}$ | 0.01 – 0.2 | % vol. |
| $H_2$ | 0 – 5 | % vol. |
| CO | 0 – 3 | % vol. |
| $CO_2$ | 2 – 15 | % vol. |
| $H_2O$ | 25 – 40 | % vol. |
| $N_2$ | balance | |

Depending on the type of industrial gas treated by the gas purification process, the hydrogen sulfide-containing gas with the high carbon dioxide content and comprising carbonyl sulfide in addition thereto may further comprise other organic sulfur compounds and/or hydrogen cyanide. The other organic sulfur compounds can be carbon disulfide, mercaptans and/or hydrocarbon disulfides. Depending on its origin in natural gas, lower alkylmercaptans and the corresponding dialkyldisulfides may be present. The lower alkylmercaptans comprise alkyl groups with up to 6 carbon atoms.

By passing the reaction off-gas and the said hydrogen sulfide-containing gas with the high carbon dioxide content jointly over the sulfided Group VII and/or Group VIII metal catalyst, as defined, at the temperature range specified, all sulfur constituents of the gas mixture other than hydrogen sulfide, including any mercaptans and/or disulfides present, will be converted to hydrogen sulfide. Sulfur dioxide will be reduced by the hydrogen present, whereas carbonyl sulfide and carbon disulfide will by hydrolysed over the catalyst to hydrogen sulfide and water. Some hydrogenation of carbonyl sulfide and carbon disulfide will also occur. Any elemental sulfur present will also be reduced to hydrogen sulfide under the conditions specified.

The hydrogen sulfide-containing gas with a high carbon dioxide content generally comprises less than 30% vol. of $H_2S$, between 20 and 95% vol. of $CO_2$ and of from 0.1 to 2.5% vol. of COS. More specifically, it may comprise 40 to 85% by vol. of $CO_2$ and 0.2 to 1.5% by vol. of COS, whereas its hydrogen sulfide content may be less than 22% vol. Its carbon disulfide content may vary and be in the range from 0 to 1.3% vol.% and its hydrogen cyanide content may be in the range of from 0 to 0.8% by volume.

Step (a) of the process according to the present invention is preferably carried out at a temperature between 200° and 350° C. To this end the mixture of the reaction off-gas of the sulfur recovery unit and the hydrogen sulfide-containing gas with the high content of carbon dioxide and carbonyl sulfide is passed over the said catalyst in the presence of at least the stoichiometric amount of free hydrogen- and/or free carbon monoxide containing gas required for the complete conversion of sulfur dioxide and elemental sulfur to hydrogen sulfide. Generally, 1.3 to 2.0 times the required stoichiometric amount is applied. Higher amounts of hydrogen and/or carbon monoxide are not considered for economical reasons only.

For the purposes of the present invention carbon monoxide is equivalent to hydrogen in its reducing capacities, as it produces hydrogen in situ in accordance with the following reaction equation:

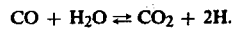

$$CO + H_2O \rightleftarrows CO_2 + 2H.$$

It has been noted that reduction of sulfur dioxide with carbon monoxide is a very fast reaction because of the hydrogen produced in situ. For that reason, the use of a hydrogen- and carbon monoxide-containing gas is particularly preferred in step (a). A gas with a $H_2/CO$ ratio between 9:1 and 2:8 may suitably be used, a gas with a $H_2/CO$ ratio of about 4:1 being preferred.

The free hydrogen- and/or free carbon-monoxide-containing gas used may advantageously be a gas containing both compounds, such as town gas, water gas or synthesis gas. Pure hydrogen or carbon monoxide may also be used. Suitable hydrogen-rich gases or gas mixtures are the off-gas of a catalytic reforming unit, the gas produced in a hydrogen plant or the gas obtained from a processing unit for saturated crude gases from petroleum. A free hydrogen- and free carbon monoxide-containing gas may further be produced by the substoichiometric combustion of lower hydrocarbon gases such as methane, ethane, propane, butane or mixtures thereof. The production of such a gas may suitably be combined with the heating of the reaction off-gas and said hydrogen sulfide-containing gas to the required reaction temperature as set out hereinafter.

After having passed the last bed of the sulfur recovery unit and the relevant condenser for the recovery of elemental sulfur, the reaction off-gases normally have a temperature of from 130° C. to 170° C. For the reduction stage over the Group VI and/or Group VIII metal catalyst, however, the off-gases must have a higher temperature and therefore these off-gases have first to be heated to a temperature in excess of 170° C. The reaction off-gases are preferably heated to a temperature in the range of from 180° C. to 450° C., together with the said hydrogen sulfide-containing gas having a high carbon dioxide content, by mixing the same with a hydrogen- and carbon monoxide-containing gas produced by the substoichiometric combustion of a lower hydrocarbon, e.g. fuel gas, or a mixture of lower hydrocarbons, with an oxygen-containing gas. Mixing of the said gases may be effected in a reaction chamber following the combustion chamber of the burner used for the substoichiometric combustion.

The increase in temperature to above 180° C. is also important in view of the presence of small amounts of elemental sulfur in the form of a mist in the reaction off-gas. This objectionable sulfur mist disappears when the temperature is raised above the dew point of sulfur. It has also been found that as a result of raising the temperature to above 180° C. the presence of elemental sulfur in the gas phase has no adverse effect on the catalytic activity of the reduction catalyst.

After heating to a temperature in excess of 180° C., the reaction off-gas and the said hydrogen sulfide-containing gas with a high carbon dioxide content, together with a free-hydrogen-containing and/or free carbon monoxide-containing gas, are passed over a sulfided Group VI and/or Group VIII metal catalyst in order to reduce sulfur dioxide to hydrogen sulfide. At the same time, elemental sulfur and carbonyl sulfide and/or other organic sulfur compounds are converted to hydrogen sulfide. Although sulfided Group VI and/or Group VIII metal catalysts supported on an inorganic oxidic carrier in general are suitable, preferred reduction catalysts for carrying out the present invention are catalysts containing one or more of the metals: molybdenum, tungsten and chromium (of the Group VI metals), and/or one or more of the metals: cobalt, nickel and iron (of the Group VIII metals), a combination of one such Group VI metal and one such Group VIII metal being preferred. The inorganic oxidic carrier may be alumina, silica, magnesia, boria, thoria, zirconia or a mixture of two or more of these compounds. Most preferred reduction catalysts for use in accordance with the process of the invention are a $Ni/Mo/Al_2O_3$ or a $Co/Mo/Al_2O_3$ catalyst.

The Group VI and/or Group VIII metal catalyst is used in the sulfided form. Sulfiding may be effected beforehand by means of a suitable sulfiding agent, such as a mixture of hydrogen and hydrogen sulfide containing 10-15% by volume of a sulfide. It is also possible, to sulfide the catalyst in situ by means of the reaction off-gas itself. Particularly suitable, however, is a sulfiding mixture comprising hydrogen, hydrogen sulfide and water in a ratio of 1:1:1, the sulfiding temperature being between 300 and 400° C. The catalyst to be sulfided may comprise the Group VI and/or Group VIII metals as the oxide or as the element.

Before being contacted with the liquid absorbent for hydrogen sulfide, the reduced gas mixture obtained in step (a) is first cooled. Preferably it is cooled to a temperature in the range of from 6° to 60° C. More preferably cooling is effected in two steps, the first one being an indirect heat exchange and the second one a direct heat exchange with water.

After cooling, the reduced gas mixture is contacted with the liquid and regeneratable solvent in an absorption zone. For this purpose both a packed or a tray column may be applied. In order to decrease the co-absorption of carbon dioxide a relatively high gas velocity is applied. It is preferred to use a gas velocity between 1.0 and 3.0 m/sec. with respect to the aerated part of the absorption zone. It is further preferred to apply an absorption zone having less than 20 absorption layers. If a tray column is used, the column should have less than 20 contacting valve trays. A packed column should have less than 20 theoretical plates. The use of an absorption zone having between 5 and 15 absorption layers is particularly preferred.

The liquid and regeneratable hydrogen-sulfide absorbent used is preferably an aqueous solution of an amine or a substituted amine. Absorbents of this type are well known in the art, such as for example the alkali metal salt of dialkyl substituted amino acids, for example, potassium dimethylamino-acetate and alkanolamines. More preferably a polyalkanolamine such as diisopropanolamine is used. In order to further reduce the co-absorption of carbon dioxide it is preferred to apply an alkanolamine with a tertiary substituted nitrogen atom such as methyldiethanolamine or triethanolamine.

The alkanolamines are preferably used in aqueous solutions in a molar concentration of 0.5 to 5 and preferably 1 to 3.

After passage through the absorbent, the unabsorbed part of the reduced gas mixture, which now consists mainly of nitrogen and carbon dioxide in addition to very small amounts of hydrogen and traces of hydrogen sulfide, is discharged into the atmosphere. If desired, this unabsorbed portion may also be incinerated in the usual manner before passing it to the stack.

The hydrogen sulfide enriched absorbent is regenerated by heating and/or stripping with steam; this produces a hydrogen sulfide enriched gas mixture and a regenerated absorbent which is re-used in step (b) for further hydrogen sulfide absorption.

The amount of stripping steam required can be reduced by applying aqueous solutions of alkanolamines comprising a strong acidic compound. The addition of an acidic compound also results in a much lower amount of hydrogen sulfide being left in the unabsorbed part of the reduced gas mixture for a given steam amount than without the use of such acidic compound. Preferably so much of this acidic compound is added that about 0.1 to 15 mole % of the alkanolamine present in the solution is present in the acid form. Suitable acidic compounds are for instance ammonium salts of acetic acid, formic acid, phosphoric acid, oxalic acid and sulfuric acid, ammonium salts of the two latter acids being preferred. Instead of the salts the acids themselves may be applied in the range indicated.

The hydrogen sulfide-rich gas mixture which is freed in the regeneration of the absorbent, which also contains co-absorbed carbon dioxide and water, is first cooled in order to condense the water present therein. Normally, at least part of this water is recycled to the regeneration step in order to maintain the water content of the aqueous absorbent at the required level. After cooling, the hydrogen sulfide-rich gas mixture is passed to the sulfur recovery unit to recover elemental sulfur from the gas.

The process according to the invention is suitably used for all hydrogen sulfide-containing gases having high carbon dioxide contents and comprising carbonyl sulfide or other organic sulfides. Hence, for example, hydrogen sulfide-containing gases recovered from processes in which natural or synthesis gases containing high amounts of carbon dioxide are cleaned, are very suitably used. The present process is particularly advantageously applied to hydrogen sulfide-containing gases obtained from an absorption process used for the purification of gases emanating from a partial combustion process.

In a special embodiment of the invention the hydrogen sulfide/carbonyl sulfide/carbon dioxide-containing gas is obtained from an absorption process which is operated under conditions such that it is non-selective or partly selective with regard to carbon dioxide. The advantages of this embodiment are that both sulfur constituents and carbon dioxide are removed in this non-selective or partly selective gas purification process to give a clean product gas which may be further used, and that very little of the carbon dioxide contained in the hydrogen sulfide-containing gas which passes directly to reduction step (a) is returned via the gas recycle to the sulfur recovery unit in step (d). The absorbent used in the non-selective or partly selective gas purification process can be any absorbent which readily absorbs both sulfur compounds and carbon dioxide, such as "sulfinol". "Sulfinol" is an aqueous solution comprising sulfolane or a derivative thereof, together with an alkanolamine such as diisopropanolamine.

The invention will now be elucidated with reference to the drawings and the Example.

FIG. 1 depicts a simplified process flow scheme in which auxiliary items of equipment, such as pumps and valves, have been omitted, and wherein a single hydrogen sulfide-containing gas stream is fed to the sulfur recovery unit.

FIG. 2 is also a simplified process scheme, showing two different hydrogen sulfide-containing gas streams being fed to the sulfur recovery unit.

In FIG. 1 a hydrogen sulfide/carbon dioxide/carbonyl sulfide-containing gas emanating from a partial combustion process is passed via line 1 to a non-selective absorption/regeneration unit 2. A product gas substantially free from hydrogen sulfide, carbon dioxide and carbonyl sulfide leaves the unit via line 3 and a hydrogen sulfide/carbon dioxide-rich gas comprising also carbonyl sulfide and/or other organic sulfur compounds leaves the unit via line 5. This gas mixture joins the reaction off-gas from a Claus type sulfur recovery unit 7 in line 10 and is fed together to an in-line burner 11. In the in-line burner, a hydrogen and carbon monoxide-containing gas is produced by substoichiometric combustion of a hydrocarbon gas. The hydrocarbon gas and the required oxygen-containing gas are fed to the burner via lines a and b. In burner 11 the gas mixture is mixed with the hot combustion gas and a heated gas mixture, now also containing the required hydrogen and carbon monoxide, is introduced via line 12 into reactor 13 wherein sulfur compounds other than hydrogen sulfide are converted to hydrogen sulfide over a reduction catalyst. The reduced gas mixture, comprising substantially no other sulfur compounds than hydrogen sulfide, leaves reactor 13 via line 14 and is cooled in a heat exchanger 15. (Instead of indirect cooling via heat exchanger 15, two-stage cooling applying an indirect heat exchange and a direct heat exchange may be used). The cooled gas mixture is passed to a selective absorption/regeneration unit 16. The unabsorbed components of the gas mixture, consisting mainly of carbon dioxide and nitrogen, are discharged from unit 16 through line 17. In order to convert any traces of hydrogen sulfide, the unabsorbed gas components are incinerated in an incinerator 18 before being discharged to the atmosphere via line 19. The hydrogen sulfide-rich gas mixture obtained from the regeneration step of the absorption/regeneration unit 16 is recycled to sulfur recovery unit 7 via line 20. Sulfur recovery unit 7 is a Claus type unit which incorporates a thermal stage and an after-cooler/sulfur condenser and a number of catalytic stages with interstage coolers/sulfur condensers (not shown in the Figure). The hydrogen sulfide is converted in the said unit, an oxygen-containing gas being fed via line 8 and elemental sulfur being removed via line 9. The reaction off-gas leaves the sulfur recovery unit via line 10 and is treated as described above.

In a special embodiment of the invention, the absorbent used in the absorption/regeneration unit 2 may be the same as the one applied in the absorption/regeneration unit 16. In the first mentioned unit, bsorbent absorbent used under operating conditions such that it is nonselective with respect to the absorption of carbon dioxide. In the second unit, the same absorbent is, however, used under operating conditions such that the solvent is highly selective with respect to carbon dioxide.

In FIG. 2 the same reference numerals have been used for identical parts. FIG. 2 differs from FIG. 1 in that via line 6 a second $H_2S$-containing gas stream is fed to the sulfur recovery unit. In refinery application it often occurs that different hydrogen sulfide-containing streams are obtained. Streams which mainly consist of hydrogen sulfide and contain little carbon dioxide (such as obtained from hydrodesulfurization of crude oils and other hydrocarbon oils) can be fed directly to the sulfur recovery unit by combining them with recycle stream 20, as shown. The second hydrogen sulfide-containing gas stream is generally relatively small with respect to the hydrogen sulfide/carbon dioxide-rich feed stream 5.

The combustion furnace 18 of FIG. 1 has been omitted from FIG. 2. This will be possible by applying an alkanolamine solution in unit 16 which contains an acidic compound such as ammonium sulfate in an amount as indicated hereinbefore. The gas stream 17 leaving the unit 16, mainly consisting of carbon dioxide and nitrogen, comprises such traces of hydrogen sulfide (less than 30 ppmv) that it may be vented into the atmosphere without being incinerated first.

EXAMPLE 1

100 kmol/h of a gas stream comprising hydrogen sulfide, carbon dioxide and carbonyl sulfide, obtained from a crude oil gasification process, is treated in accordance with the flow scheme of FIG. 1. The gas stream is fed to the sulfinol unit at a pressure of about 20 bar and a temperature of 60° C. The treated gas leaving the sulfinol unit is substantially free of hydrogen sulfide and contains only little carbonyl sulfide. After atmospheric regeneration of the sulfinol solvent, a hydrogen sulfide-containing gas stream with a high carbon dioxide content and containing in addition carbonyl sulfide is obtained. This gas stream, obtained at a rate of 3.33 kmol/h, is mixed with the reaction off-gas of the sulfur recovery unit obtained at a rate of 3.15 kmol/h and a temperature of 150° C. The combined gas mixture, comprising inter alia sulfur dioxide and some elemental sulfur, is heated in an in-line burner to 290° C. and fed at this temperature to the reduction reactor comprising a sulfided $Co/Mo/Al_2O_3$ catalyst. In the reactor, the convertible sulfur compounds are converted to hydrogen sulfide in the presence of hydrogen which is added to the reactor as a separate stream. The gas mixture leaving the reduction reactor does not comprise any sulfur dioxide or elemental sulfur and only little carbonyl sulfide. It is cooled in two stages to 45° C. and fed to an atmospheric absorption column operating on a methyldiethanolamine aqueous solution (2.2 molar). The unabsorbed portion of the treated gas mixture mainly contains nitrogen and carbon dioxide and small amounts of hydrogen sulfide and carbonyl sulfide. It is fed to a catalytic incinerator operating at a temperature of 375° C. for the combustion of hydrogen sulfide and carbonyl sulfide to sulfur dioxide. After regeneration of the alkanolamine absorption solution, the hydrogen sulfide-rich gas mixture obtained is fed to the sulfur recovery unit. This gas mixture contains only 16.0% of the carbon dioxide content originally present in the feed stream to the sulfinol unit. It does not contain any carbonyl sulfide.

The composition of the different gas streams is given in the following Table. Though the carbonyl sulfide in the gas stream leaving the absorption column is present in an amount of 400 ppmv, the total conversion of carbonyl sulfide in the process is 88.6%. The total sulfur recovered in the sulfur recovery unit is 99.3% of total sulfur present in the original gas stream to the sulfinol unit.

TABLE

| Composition | Stream No. | | | | | | | |
|---|---|---|---|---|---|---|---|---|
| | 1 | 3 | 5 | 10 | 12 | 14 | 17 | 20 |
| $H_2S$ | 0.67(0.67) | $3 \times 10^{-4}$(3ppm) | 0.67(20.1) | 0.028(0.88) | 0.70(10.4) | 0.75(11.2) | 0.001(200ppm) | 0.75(63.0) |
| $SO_2$ | — | — | — | 0.014(0.44) | 0.014(0.2) | — | — | — |
| $CO_2$ | 2.44(2.44) | 0.01(100ppm) | 2.43(72.9) | 0.42(13.3) | 2.86(42.7) | 2.89(43.2) | 2.50(51.2) | 0.39(32.8) |
| COS | 0.035(0.035) | 0.002(21ppm) | 0.033(1.0) | 0.001(0.03) | 0.034(0.5) | 0.002(0.03) | 0.002(400ppm) | — |
| $H_2O$ | 0.59 (0.59) | 0.54(0.56) | 0.17(5.1) | 0.86(27.3) | 1.06(15.8) | 1.06(15.8) | 0.39(7.9) | 0.05(4.2) |
| $N_2$ | 58.14 (58.14) | 58.12(60.05) | 0.02(0.6) | 1.79(56.8) | 1.93(28.8) | 1.93(28.9) | 1.93(39.5) | — |
| other components | 38.12 (38.12) | 38.11(39.38) | 0.01(0.3) | 0.04(1.5) | 0.11(1.6) | 0.06(0.9) | 0.06(1.2) | — |
| Total | 100(100) | 96.78(100) | 3.33(100) | 3.15(100 | 6.71(100) | 6.69(100) | 4.88(100) | 1.19(100) |

Numbers without parentheses = kilomoles
Numbers in parentheses = volume percent unless shown as ppm (parts per million) by volume

What we claim is:

1. In a process for sulfur removal from hydrogen sulfide-containing gases wherein said gases may comprise a plurality of streams at least the major portion of which contains a high proportion of carbon dioxide together with carbonyl sulfide or organic sulfur compounds or both, in which process the sulfur containing constituents of said gases are converted to elemental sulfur in a Claus plant, the steps comprising:

(a) passing a gas stream from step (h), optionally in combination with fresh feed gas which contains hydrogen sulfide and is low in carbon dioxide, carbonyl sulfide and organic sulfur compounds, to a Clause plant wherein the predominant part of the hydrogen sulfide contained in the gas entering said Claus plant is converted to elemental sulfur, which is recovered;

(b) recovering, from said Claus plant, off-gas which contains residual hydrogen sulfide;

(c) combining said off-gas with a hydrogen sulfide-containing gas which has a high content of carbon dioxide together with carbonyl sulfide and/or other organic sulfur compounds;

(d) passing the combined gas streams from step (c) at a temperature in the range from 180° C. to 450° C. in the presence of a free hydrogen- and/or free carbon monoxide-containing gas over a sulfide Group VI and/or Group VIII metal catalyst supported on an organic oxidic carrier for the conversion of sulfur compounds other than hydrogen sulfide to hydrogen sulfide;

(e) cooling the reduced gas mixture obtained in step (d) and passing it in a absorption zone, at a temperature below the dew point of water, through a liquid, regenerable absorbent for hydrogen sulfide at a gas velocity of 1 m/sec. or more with respect to the aerated part of the said absorption zone;

(f) discharging the unabsorbed portion of the gas mixture from the process after passage through the said absorbent;

(g) regenerating the hydrogen sulfide enriched absorbent, thereby producing a hydrogen sulfide-rich gas mixture and regenerated absorbent;

(h) returning regenerated absorbent obtained in step (g) to step (e) for further hydrogen sulfide absorption and passing the hydrogen sulfide-rich gas mixture obtained in step (g) to the Claus plant for conversion of the hydrogen sulfide to elemental sulfur.

2. A process as claimed in claim 1, in which said other organic sulfur compounds are members of the group consisting of carbon disulfide, alkylmercaptans and dialkyldisulfides.

3. A process as claimed in claim 1, in which the hydrogen sulfide-containing gas having a high content of carbon dioxide comprises hydrogen cyanide.

4. A process as claimed in claim 1, in which the hydrogen sulfide-containing gas having a high content of carbon dioxide comprises less than 30% vol. of $H_2S$, between 20 and 95% vol. of $CO_2$ and of from 0.1 to 2.5% vol. of COS.

5. A process as claimed in claim 4, in which the hydrogen sulfide-containing gas comprises 40 to 85% vol. of carbon dioxide and 0.2 to 1.5% vol. of carbonyl sulfide.

6. A process as claimed in claim 5, in which the hydrogen sulfide-containing gas comprises between 0 and 1.3% by volume of carbon disulfide, between 0 and 1.2% by volume of at least one member of the group consisting of mercaptans and dialkyldisulfides, and between 0 to 0.8% by volume of hydrogen cyanide.

7. A process as claimed in claim 1, in which the hydrogen sulfide-containing gas having a high carbon dioxide content is obtained from an absorption process in which a hydrogen sulfide-and carbon dioxide-containing gas is treated for the removal of hydrogen sulfide under operating conditions such that the process is relatively non-selective with regard to carbon dioxide.

8. A process as claimed in claim 1, in which the combined off-gas from step (b) and hydrogen sulfide-containing gas having a high carbon dioxide content are heated to a temperature between 180° C. and 450° C. by mixing the same with a hydrogen and carbon monoxide-containing gas produced by the substoichiometric combustion of a lower hydrocarbon or a mixture of lower hydrocarbons with an oxygen-containing gas.

9. A process as claimed in claim 1, in which the temperature in step (d) is between 200° and 350° C. and the reduced gas mixture obtained in step (d) is cooled to a temperature in the range of from 6° to 60° C. in two steps, the first one being an indirect heat exchange and the second one a direct heat exchange with water, and is thereafter contacted with the liquid, regenerable absorbent in a layered absorption zone having less than 20 absorption layers at a gas velocity between 1.0 and 3.0 m/sec with respect to the aerated part of the absorption zone.

10. A process as claimed in claim 9, in which the liquid, regenerable absorbent is an aqueous solution of an alkanolamine with a tertiary substituted nitrogen atom.

11. A process as claimed in claim 10, in which the aqueous solution of the alkanolamine comprises such an amount of a strong acidic compound that 0.1 to 15 mol.% of the alkanolamine present in the solution is present in the acid form.

12. A process as claimed in claim 11, in which the strong acidic compound is sulfuric acid or oxalic acid or an ammonium salt thereof.

13. In a process for sulfur removal from hydrogen sulfide-containing gases wherein said gases may comprise a plurality of streams at least the major portion of which contains a high proportion of carbon dioxide together with carbonyl sulfide or organic sulfur compounds or both, in which process: (1) the sulfur containing constituents of said gases are converted to elemental sulfur in a Claus plant; (2) the sulfur formed is removed from the process; (3) the reaction off-gases from said Claus plant are passed, together with a free hydrogen- and/or free carbon monoxide-containing gas at a temperature above 175° C. into a reduction zone wherein they are contacted with a sulfided Group VI and/or Group VII metal catalyst supported on an inorganic oxidic carrier; (4) the reduced off-gases thus obtained are passed through a liquid, regenerable absorbent which is selective for hydrogen sulfide and carbon dioxide; (5) the unabsorbed portion of the said reduced off-gases is discharged into the atmosphere; (6) the hydrogen sulfide-enriched absorbent is regenerated and used again for further absorption of hydrogen sulfide; and (7) the hydrogen sulfide-rich gas mixture liberated in the regeneration is passed to said Claus plant;

the improvement which comprises combining at least the predominant part of the hydrogen sulfide-containing gas which contains a high proportion of carbon dioxide with the reaction off-gases from the Claus plant before they are passed into said reduction zone.

* * * * *